United States Patent [19]

Allen et al.

[11] 4,234,938
[45] Nov. 18, 1980

[54] DETERMINATION OF REFLECTIVITY AND WATER DEPTH FOR MARINE SEISMIC EXPLORATION

[75] Inventors: Kenneth P. Allen, Stamford, Conn.; Maynard S. Redeker, Farmers Branch, Tex.

[73] Assignee: Mobil Oil Corporation, New York, N.Y.

[21] Appl. No.: 844,549

[22] Filed: Oct. 25, 1977

Related U.S. Application Data

[63] Continuation-in-part of Ser. No. 709,484, Jul. 28, 1976.

[51] Int. Cl.$^3$ .............................................. G01V 1/38
[52] U.S. Cl. ...................................... 367/24; 367/46; 181/111
[58] Field of Search .................. 340/15.5 F, 15.5 CP, 340/7 R; 181/110, 111, 118, 120; 367/15, 21–24, 43, 46

[56] References Cited

U.S. PATENT DOCUMENTS

| | | | |
|---|---|---|---|
| 3,278,893 | 10/1966 | Silverman | 340/7 R |
| 3,350,683 | 10/1967 | Sengbush | 367/24 |
| 3,353,624 | 11/1967 | Redding | 340/7 R |
| 3,365,697 | 1/1968 | Fail et al. | 340/15.5 F |
| 3,396,365 | 8/1968 | Kerns | 340/15.5 F |
| 3,629,800 | 12/1971 | Schneider | 367/24 |
| 3,687,218 | 8/1972 | Ritter | 340/7 R |
| 3,893,539 | 9/1973 | Mott-Smith | 340/7 R |
| 4,146,871 | 3/1979 | Ruehle | 340/7 R |

FOREIGN PATENT DOCUMENTS 1193507  6/1970  United Kingdom .................... 340/7 R

OTHER PUBLICATIONS

"Spectra of Water Reverberations for Primary and Multiple Reflections," *Geophysics*, John Pflueger, vol. 37, No. 5, Oct. 1972, pp. 788–796.
"Water Reverberations–Their Nature and Elimination," Backus, *Geophysics*, vol. 24, No. 2, Apr. 1959, pp. 233–261.

*Primary Examiner*—Howard A. Birmiel
*Attorney, Agent, or Firm*—C. A. Huggett; William J. Scherback

[57] ABSTRACT

In marine seismic exploration, measurements of reflectivity and water depth are made from seismograms produced by the firing of a seismic energy source towed by a marine vessel. The measurements are made by generating the auto-correlation coefficients of a window of the seismogram and combining these coefficients for different time lags. The time lag producing the minimum energy in the combined autocorrelation coefficients represents water depth. The reflectivity of the water bottom is obtained by generating an estimate of the reflectivity from the values of the auto-correlation function of the window, and modifying this estimate by a factor which converts the estimate to the reflectivity. The measured water depth and reflectivity are converted into an inverse operator. A linear array of sources is then fired in a sequence such that the acoustic pulses combine to produce a resultant acoustic pressure wave having the inverse time domain operator characteristics.

7 Claims, 13 Drawing Figures

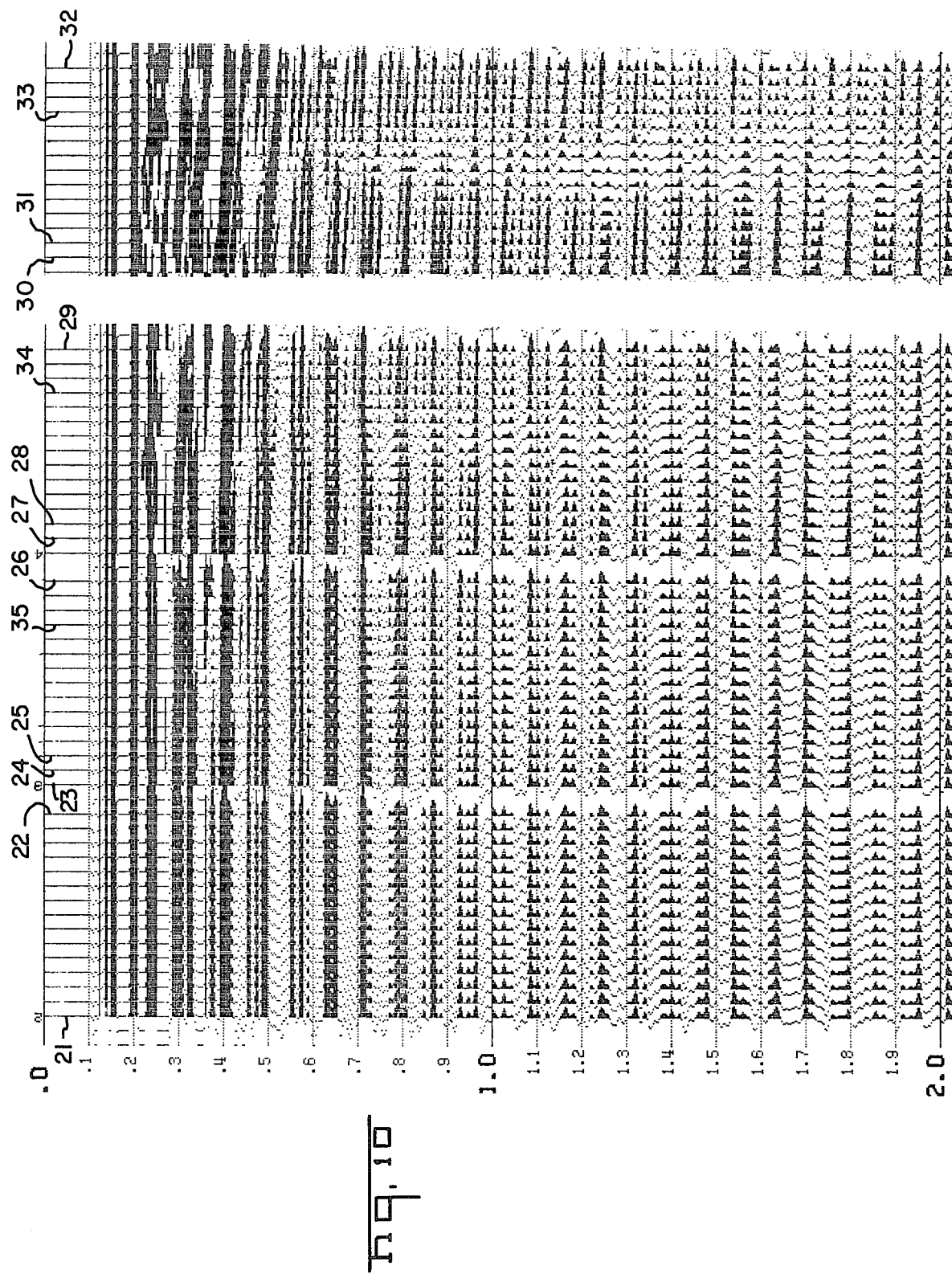

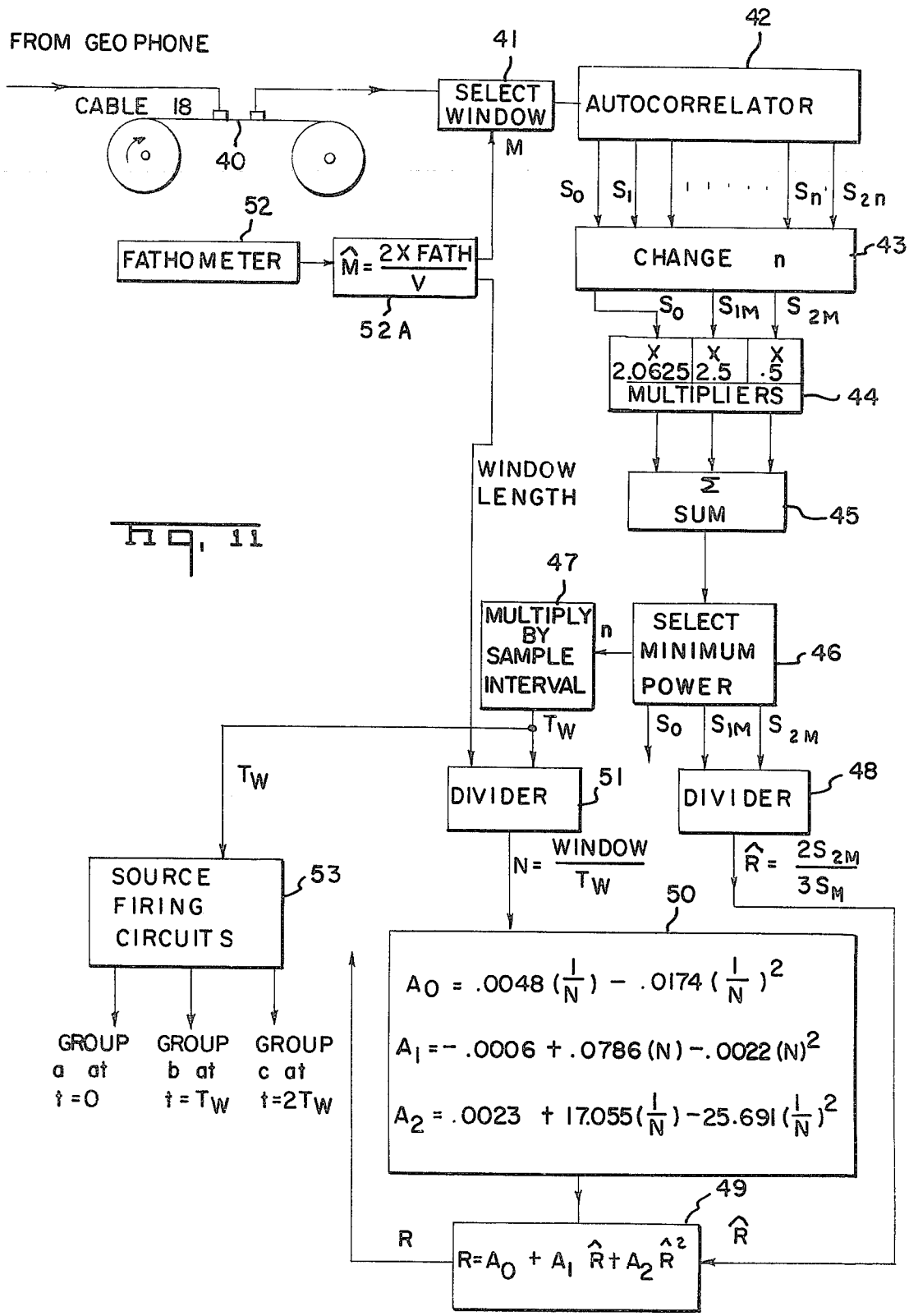

DETERMINATION OF REFLECTIVITY AND WATER DEPTH FOR MARINE SEISMIC EXPLORATION

CROSS REFERENCE TO RELATED APPLICATIONS

This application is a continuation-in-part of U.S. patent application Ser. No. 709,484, filed July 28, 1976.

BACKGROUND OF THE INVENTION

This invention relates to marine seismic exploration and more particularly to the determination of reflectivity and water depth for use in firing a linear array of sources as an inverse distortion operator.

In marine seismic exploration, seismic energy can be generated from a towed array of sources. The resultant acoustic pressure waves are reflected from the subsurface formations and recorded as seismograms. Unfortunately, the seismograms include distortion which obscures the characteristics of the subsurface formations. In marine exploration, this distortion is often severe. It includes water bottom multiples as depicted in FIG. 1 and reverberations as depicted in FIGS. 2 and 3.

As the initial shot pulse travels to the bottom of the water, it is partially transmitted and partially reflected at this boundary. The transmitted part is reflected by the discontinuity beneath the water to become a primary reflection. The reflected part bounces back to the surface where it is again reflected to the water bottom. Once more, part of this pulse passes through the boundary and part is reflected. This process continues indefinitely. Each time a pulse bounces between the surface and the bottom of the water, a pulse emerges from the boundary at the bottom to follow the initial pulse into the section. These multiple pulses are delayed equal time intervals relative to each other, and their amplitudes are successively reduced by the reflection coefficient at the bottom of the water. The net result of this is to produce a seismogram consisting of a single primary followed by a train of equally spaced multiples or reverberations.

In U.S. Pat. No. 3,689,874 to Foster et al there is described a method and apparatus for removing the reverberation distortion present in seismic data by an operation which separates the reverberation distortion component of the data from the component representing the characteristics of the subsurface formation. This operaion is known as dereverberation and more particularly involves the obtaining of a dereverberation operator in the form of an inverse filter that is applied to the seismic data to produce a signal which approximates the signal which would have been produced by a desired shot pulse interacting with the reflectivity of the subsurface formation in the absence of the reverberation distortion.

While dereverberation has been successfully used on many marine seismograms, it is not effective in many areas. Particularly where the water bottom is hard, the reverberations are so severe that the complete dynamic range of the recording system is required just to faithfully record the reverberations. Accordingly, it is desirable to suppress the reverberations before recording.

SUMMARY OF THE INVENTION

In accordance with this invention, an improved technique of determining the water bottom reflectivity and the water depth is provided. These measurements are converted to a three-point distortion operator and the array of seismic sources is fired in a time sequence which produces this three-point operator.

In measuring water depth, the auto-correlation coefficients of a window of conventionally produced seismograms are generated with zero lag and with lags of n and 2n time samples. These coefficients are combined for various values of n to determine the minimum of an energy function. The n producing the minimum is a measure of water depth. It is obtained more accurately and more quickly than in prior art techniques which require many more steps.

In the measurement of reflectivity, an estimate of reflectivity is obtained by a prior art technique utilizing the values of the auto-correlation function of a window of the trace. A correction factor is applied to this estimate which converts it to a better representation of the true reflectivity.

A further aspect of this invention provides an improved technique for converting measurements of water depth and reflectivity to a three-point operator which is produced by a sequenced firing of an array of sources.

The foregoing and other objects, features, and advantages of the invention will be better understood from the drawings and the following more detailed description and appended claims.

DESCRIPTION OF THE DRAWINGS

FIG. 10 depicts a conventionally produced seismogram combined with assumed values of R and $T_w$;
FIG. 11 shows the system of this invention.

DESCRIPTION OF THE PREFERRED EMBODIMENT

Figure 4:
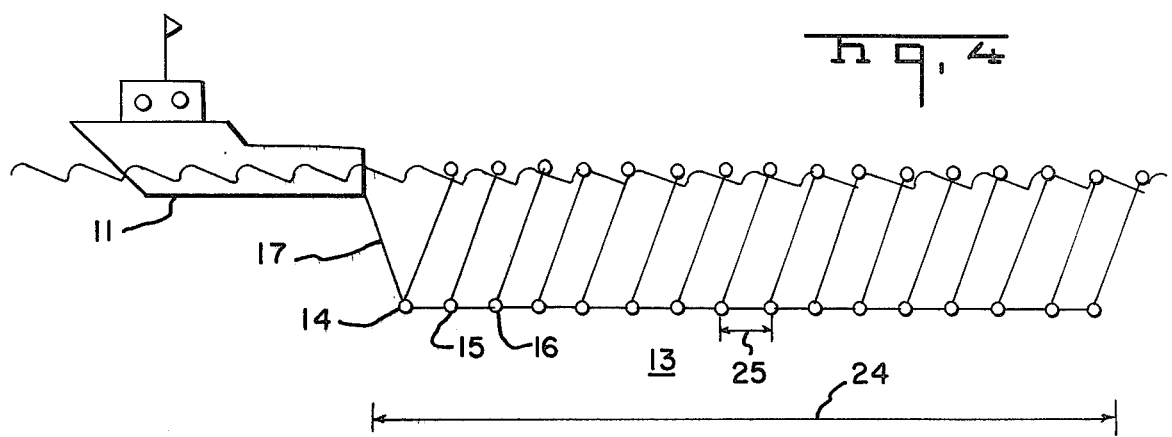
FIGS. 4 and 5 shows a marine seismic exploration system.
Figure 5:
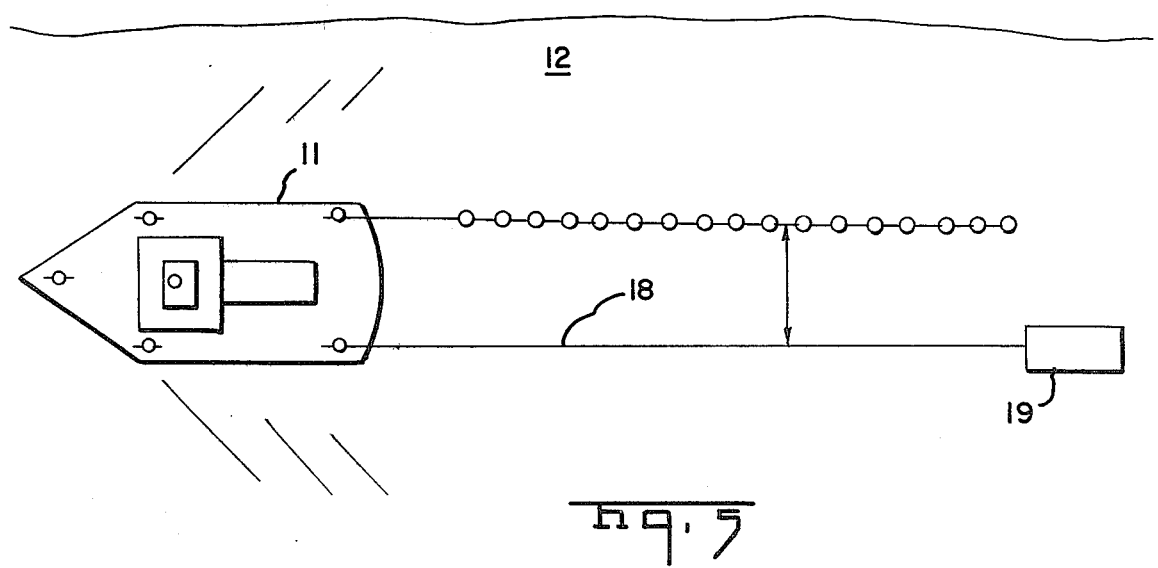

FIGS. 4 and 5 shows a marine seismic exploration system. A vessel 11 traverses a seismic exploration path in surveying the subsurface formation 12 below the water layer 13. A linear horizontal array of seismic sources, 14, 15, 16 and others, is towed behind the boat by the cable 17. Surface floats help to maintain the equal spacing between the sources.

A hydrophone streamer 18 is also towed behind the boat. A surface support buoy 19 helps to maintain the proper relationship between the hydrophone streamer and the source array.

A seismic trace which is generated during seismic marine exploration by this system may be described mathematically as follows:

$$S(t) = B(t) * H(t) * R(t) + N(t) \qquad (1)$$

where,
S(t) = seismic trace,
B(t) = shot pulse,
H(t) = reverberation distortion,
R(t) = reflectivity function, and N(t)=noise.

Equation (1) states that the seismic trace is produced by the shot pulse convolved with the reverberation distortion convolved with the reflectivity, plus coherent and random noise. [Convolution is denoted by an asterisk (*).] Convolution is the process of filtering. Consequently, the seismic trace is the result of the shot pulse being filtered by the reflectivity of the earth and by the reverberation distortion.

Basically, the reverberation distortion is a function of both the magnitudes and signs of the reflection coefficients, R, at the bottom of the water and at the water surface. The reverberations of the shot pulse are delayed equal time intervals relative to each other, and their amplitudes are successively reduced by these reflection coefficients. The reflection coefficient at the water bottom can be either positive (+) or negative (−) in sign depending on the nature of the water bottom, while the reflection coefficient at the water surface is always negative (−) and is assumed to be unit (−1). Further, each multiple pulse is reduced in amplitude from the previous one by the magnitude of the water bottom reflectivity R. Accordingly, a dereverberation operator can be described by the two-point operator i(t):

$$i(t) = \delta(t) + R\delta(t + T_w) \quad (2)$$

Figure 1:
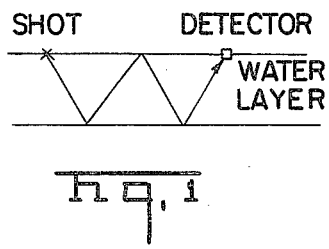
FIG. 1 depicts water bottom multiples.
Figure 2:
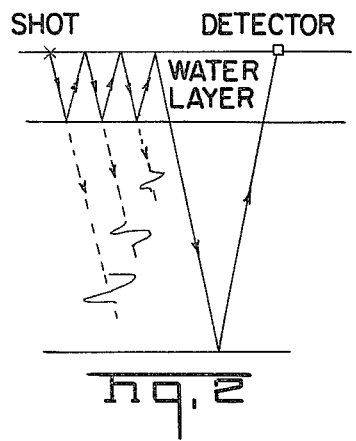
FIGS. 2 and 3 depict water reverberations.
Figure 3:
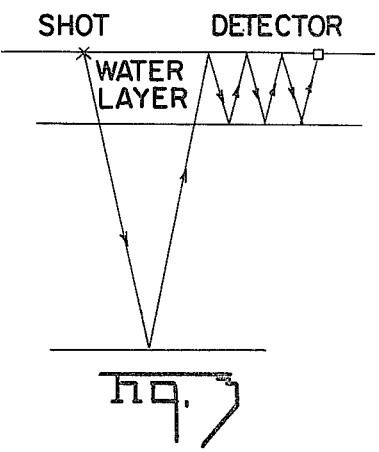
Figure 6:
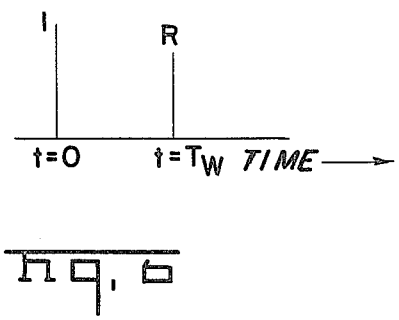
FIGS. 6–9 illustrate two- and three-point time domain inverse operators.
Figure 7:
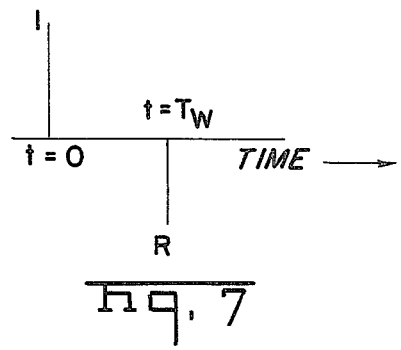

This operator, consisting of a first impulse of unity magnitude at t=0 and a second impulse of magnitude R at $t=T_w$, can be illustrated in two forms. The first is shown in FIG. 6 for a positive water bottom reflection coefficient, +R. The second is shown in FIG. 7 for a negative water bottom coefficient, −R.

In those circumstances wherein the water bottom is relatively flat, the downward-going reverberation distortion at the shotpoint, and the upward-going reverberation distortion at the detector are approximately the same. Consequently, for a flat water bottom, a total dereverberation operator I(t) can be represented by the convolution of the two-point operator at the shotpoint, $i_s(t)$, with the two-point operator, $i_d(t)$, at the detector.

$$I(t) = i_s(t) * i_d(t) \quad (3)$$

$$= [\delta(t) + R\delta(t + T_w)] * [\delta(t) + R\delta(t + T_w)] \quad (4)$$

$$= \delta(t) + 2R\delta(t + T_w) + R^2\delta(t + T_w) \quad (5)$$

Figure 8:
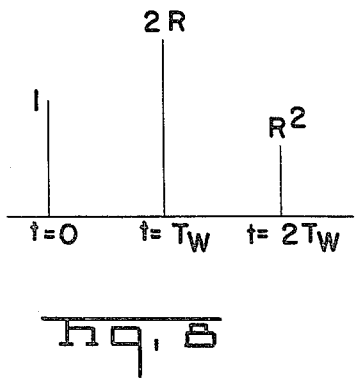
Figure 9:
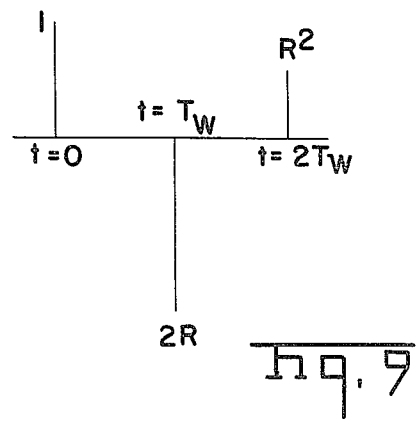

For the case of a positive water bottom reflectivity, +R, the dereverberation operator can be illustrated as in FIG. 8; while for a negative water bottom reflectivity, −R, the dereverberation operator can be illustrated as in FIG. 9. It can therefore be seen that the total dereverberation operator I(t) for a flat water bottom is a three-point operator consisting of three impulses—the first of unity magnitude at t=0, the second of magnitude 2R at $t=T_w$, and the third of magnitude $R^2$ at $t=2T_w$.

By firing the sources in various groups, with different firing times for each group, the resultant acoustic pressure wave has the time domain characteristics depicted in FIGS. 8 and 9. As an example, the operator of FIG. 8 is generated by firing a first group of pulses at time t=0. The amplitude of the pulse generated by this group is arbitrarily designated unity. A second group of pulses is fired at time $T_w$. The amplitude of the pulse produced by the second group is related to that of the first group by a factor 2R, where R is the reflectivity of the water bottom. A third group of pulses is fired at time $2T_w$. The amplitude of the pulse produced by the third group is related to the amplitude of the first pulse by a factor $R^2$. It can be shown that firing the sources in a sequence such as the foregoing produces suppressed reverberations.

In order to fire the array of sources in such a sequence, it is necessary to determine the reflection coefficient R and the two-way travel time $T_w$ of acoustic energy through the water depth.

A conventional seismogram produced by firing at least one of the guns can be used to determine R and $T_w$. As an example of this, consider FIG. 10. FIG. 10 depicts a conventional seismogram which has been combined, or stacked, in accordance with:

1, 2R, $R^2$ at t=0, $T_w$, $2T_w$ for different assumed values of R and $T_w$. The seismic sections under the lines 21 . . . 22 represent reflections detected by the geophones 19 as a function of time (ordinate) after the shot. The seismic sections under the lines 23–25 represent the same seismic sections stacked with an assumed reflectivity R=0.1 and for various assumed values of $T_w$. The seismic section under the line 24 is the sum of the conventionally produced section plus the conventionally produced section weighted by a factor of 2(0.1) delayed by 96 msecs., plus the conventionally produced trace weighted by a factor of $(0.1)^2$ delayed by 192 msecs. The section under the line 25 is the sum of the conventionally produced trace weighted by the same factors but delayed by 98 msecs. and twice 98 msecs. The last section in this set under the line 26 is the sum of the conventionally produced trace weighted in the same manner but delayed by 120 msecs. and twice 120 msecs.

The sections under the lines 27–29 are combined, or stacked, sections with the same time delays, 94, 96 . . . and 120 msecs. but with an assumed reflectivity of R=0.2. The sections under the lines 30, 31, 32 are stacked sections with an assumed reflectivity of R=0.5, and with the same time delays. The values of R and $T_w$ can be determined from such an analysis by selecting the values of R and $T_w$ which produce the minimum energy in a section. Visual analysis of FIG. 10 shows that the section 33 has the minimum energy therein. This indicates that a correct value of R is 0.5, and the correct value of $T_w$ is 114 msecs.

The values of R and $T_w$ can be automatically determined in this manner but a very large number of operations is required, and generally it is not practical to make such an analysis on ship board. The present invention provides means for automatically making such an analysis on board the ship.

FIG. 10 illustrates an important aspect of this invention. FIG. 10 shows that the correct value of $T_w$ can be determined for any assumed value of R. That is, the section 34 has the minimum energy in its set and this indicates a value of $T_w$ of 114 msecs. even though an incorrect value of R=0.2 was used in the stacking. Similarly, the section 35 has the minimum energy in its set and this indicates a correct value of $T_w$=114 msecs. even though an incorrect value of R=0.1 was used in the stacking. The present invention uses this phenomena by assuming a value of reflectivity in determining $T_w$.

Then, reflectivity can be determined from the known value of $T_w$.

FIG. 11 depicts a system for determining R and $T_w$ in accordance with this invention. A seismogram from a conventionally produced shot is recorded on magnetic tape 40 as is standard. A portion, or window, of this seismogram is played back as indicated at 41. This window is auto-correlated by the auto-correlator 42.

Figure 12:
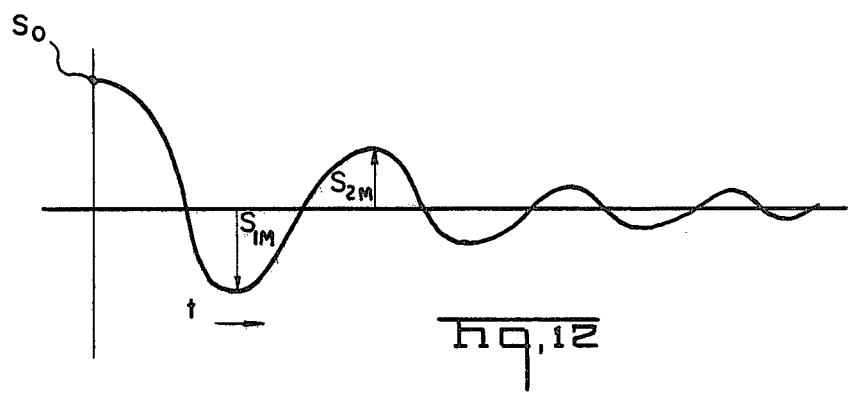
FIG. 12 shows the correlation function of a selected window.

The auto-correlation function is shown in FIG. 12. As is well known, auto-correlation requires the point-by-point multiplication of the samples in the window by themselves to produce a set of auto-correlation coefficients which are then summed to produce one point on the auto-correlation function of FIG. 12. Then, the window is time shifted, the samples are again multiplied one by the other and summed to form another point on the auto-correlation function. The process is repeated for various time shifts.

As an example, with zero time shift, the samples in the window are multiplied by themselves to produce the zero lag auto-correlation coefficients. These are summed to produce the value $S_0$ on the curve of FIG. 12. Then, the samples of the window are shifted by one time sample, multiplied one by the other to produce the coefficients at one time sample lag. These are summed to form another point on the correlation function of FIG. 12. In general, the window is shifted with respect to itself by a number of time samples designated n.

In accordance with this invention, the zero lag auto-correlation coefficients $S_0$ are combined with the auto-correlation coefficients for a lag of n and for a lag of 2n for various values of n. The change in the value of n is indicated at 43 in FIG. 11. For example, if n=1, then the output of 43 is $S_0$, $S_1$, $S_2$; if n is changed to 2, then the output is $S_0$, $S_2$, $S_3$; if n=3, then $S_0=S_0$, $S_m=S_3$ and $S_{2m}=S_6$ and so on. The combination takes place in the mutlipliers 44. The zero lag value $S_0$ is multiplied by 2.0625. The value of the correlation function at a lag of n, designated $S_m$, is multiplied by 2.5 and the value at a lag of 2n, designated $S_{2m}$, is multiplied by 0.5. These products are summed at 45. The minimum power, that is, the least sum, in the combined autocorrelation functions is selected at 46. The minimum power sum specifies the correct n which is designated M.

Since M is in sample times, this can be directly converted to $T_w$ because the time per sample is known. For example, the sections of FIG. 10 have a sample interval of 2 msecs. Assuming that a minimum power in the combined auto-correlation coefficients is detected when n=57, then the output of 47 is a $T_w$ of 114 msecs.

The determination of reflectivity is an improvement on the technique described in Pflueger, "SPECTRA OF WATER REVERBERATIONS FOR PRIMARY AND MULTIPLE REFLECTIONS," *GEOPHYSICS*, Vol. 37, No. 5 (October 1972), pp. 788–796. In that prior art technique, reflectivity is related to the ratio of the amplitude of the side lobes of the auto-correlation function occurring at multiples of $T_w$. This procedure provides a good estimate of reflectivity when the auto-correlation window is quite long. However, the use of a long auto-correlation window introduces other problems, notably the introduction of noise. It is for this reason that the window selected at 41 is a relatively short multiple of $T_w$.

The determination of reflectivity in accordance with the present invention makes use of the Pflueger technique to determine a first estimate $\hat{R}$. The divider 48 forms the ratio:

$$(2 S_{2M})/(3 S_{1M})$$

Where $S_{1M}$ is the determined interpolated value of the correlation function at $T_w$ and $S_{2M}$ is the interpolated value of the auto-correlation function at $2T_w$.

The auto-correlation function is interpolated to get a finer sampling rate. As an example, the auto-correlation coefficients may be produced at 4 msec. intervals, and it is desired to convert this to a 1 msec. sampling rate. In order to do this, it is assumed that the auto-correlation function is a sin x/x function. Using this interpolation technique preserves the amplitude spectrum of the data and introduces no new frequencies.

Figure 13:
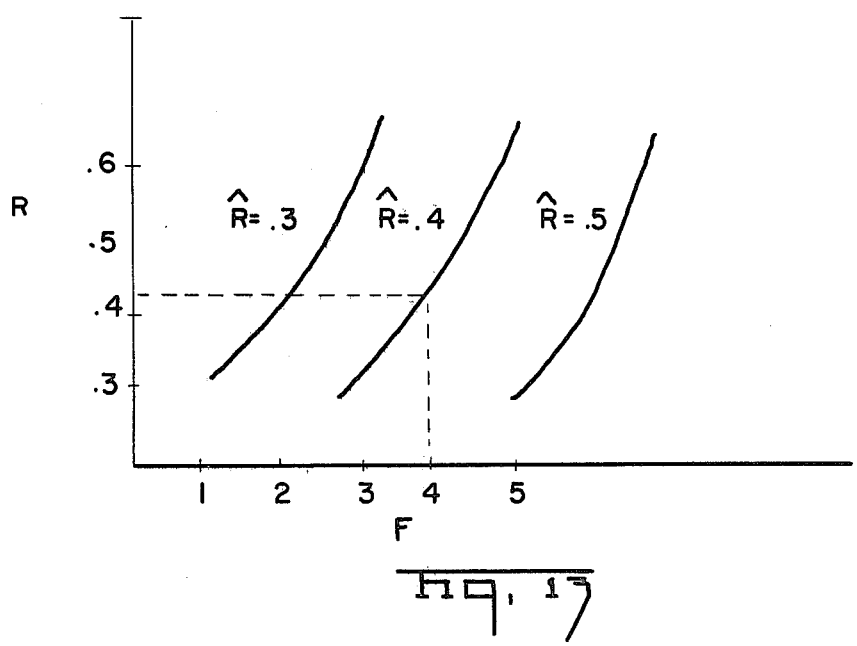
FIG. 13 depicts conversion from an estimated reflectivity to actual reflectivity.

It can be shown that the estimate $\hat{R}$ is related to true reflectivity R in the manner depicted in FIG. 13. F is the length of the correlation window in terms of the number of $T_w$'s which are included in the window. As an example, suppose the auto-correlation window extends from $3T_w$ to $7T_w$ and $\hat{R}$ is determined to be 0.4 from Pflueger's technique. Then, F=4 and FIG. 13 shows that R is approximately 0.425. In actual practice, reference is not made to a graph like FIG. 13. Rather coefficients are stored in memory which are applied to the estimate $\hat{R}$ to convert it to the true value of R. The coefficients are $A_0$, $A_1$ and $A_2$ which are applied to $\hat{R}$ as indicated at 49.

The coefficients are a least squares fit to a surface described by plotting the true value of R as a function of N and the first estimate of R. Specifically, the coefficients are determined as indicated at 50. The value of F for this procedure is found by dividing the length of the window by $T_w$ as indicated at 51.

The length of the auto-correlation window, selected at 41, is a function of the two-way travel time as determined from the fathometer 52. The auto-correlation lag $\hat{M}$ is determined by dividing twice the fathometer reading by the velocity of sound in water, assumed to be 4800 feet per second. This ratio is determined at 52A. The length of the auto-correlation window is a multiple of the auto-correlation lag $\hat{M}$. Generally, a window extending from 5M to 15M for each trace will be suitable.

A better understanding of this invention may be had from the following short description of the underlying theory. A seismic trace with a reverberation operator applied can be represented as:

$$\hat{S}_i = S_i + 2\hat{R}S_{i-n} + \hat{R}^2 S_{i-2n} \qquad (6)$$

where $S_i$ is the ith sample of the seismogram and $S_{i-n}$ is a sample with time shift n.

In accordance with this invention, we assume any reasonable value of R. For example, assume R=0.5. Then, equation (6) becomes:

$$\hat{S}_i = S_I + S_{i-n} + 0.25 S_{i-2n} \qquad (7)$$

In accordance with least square theory, the correct value of R and n is obtained when the sum of the squares of the foregoing in a minimum. That is, the correct n occurs where the following is a minimum:

$$\sum_i \hat{S}_i^2 = \sum_i S_i^2 + 4\hat{R}^2 \sum_i S_{i-n}^2 + \hat{R}^4 \sum_i S_{i-2n} \\ + 4\hat{R} \sum_i S_i S_{i-n} + 2\hat{R} \sum_i S_i S_{i-2n} \qquad (8)$$

-continued $$+ 4\hat{R}^3 \sum_i S_{i-n} S_{i-2n}$$

To carry out the foregoing requires a very large number of computer operations. To determine the correct n in this manner would require approximately 200,000 operations. To make the determination for ten different values of n would require approximately 2,000,000 operations. In accordance with an aspect of this invention, certain simplifying assumptions are made. If the length of the window is long compared to the time shift n, the samples in two windows which are shifted with respect to each other by n are the same. Therefore, we can assume the following:

$$\sum_i S_i^2 = \sum_i S_{i-n}^2 = \sum_i S_{i-2n}^2 = S_o \quad (9)$$

and $$\sum_i S_i S_{i-n} = \sum_i S_{i-n} S_{1-2n} = S_M \quad (10)$$

and $$\sum_i S_i S_{1-2n} = S_{2M} \quad (11)$$

Using these assumptions, equation (7) becomes:

$$\sum_i \hat{S}_i^2 = (1 + 4\hat{R}^2 + \hat{R}^4) S_o + (4\hat{R} + 4\hat{R}^3) S_M + 2\hat{R}^2 S_{2M} \quad (12)$$

Using an assumed value of R=0.5, this becomes:

$$\sum_i \hat{S}_i^2 = 2.0625 S_o + 2.5 S_M + .5 S_{2M} \quad (13)$$

It is in this manner that the simplifying multipliers used at 44 are obtained.

In carrying out this invention, it is necessary to find the correlation function only once. As previously mentioned, this might require approximately 200,000 operations. In order to do this for ten different values of n, it is necessary to repeat the multiplication of $S_M$ and $S_{2M}$ by 2.5 and 0.5 only nine further times. This adds eighteen operations for a total of 200,018 operations. This is approximately a tenfold decrease over the number of operations required without the simplifying assumptions.

Having determined $T_w$ and R, the sources are fired in groups which produce the desired three-point operator. The sources are fired in three groups designated a, b and c. The a group is fired at time t=0. Group b is fired at t=$T_w$, and group c is fired at t=$2T_w$. The firing circuits 53 for accomplishing this may be of the type shown in U.S. Pat. No. 3,687,218—Ritter.

The number of sources in each group is determined by the value of R. If a, b and c denote the number of sources in each group, these numbers are related to the determined reflectivity by the following:

$$a + b + c = \text{total number of sources}$$
$$\frac{b}{a} = 2R$$
$$\frac{c}{a} = R^2$$

A typical array which has been used in practice includes forty sources which are designated by the numerals "1" through "40". In this example, four sources are used as spares and the sources are fired in the following groups:

```
if   R = .3      (a,b,c) = (20,28,39)
     a = 40,39,37,36,33,32,30,29,27, ,23,22,19,18,13,12,10,9,7,4,3
     b = 38,34,31,28,24,21,20,16,14,11,8,5,2
     c = 25,17
if   R = .4      (a,b,c) = (23,26,38)
     a = 40,38,36,33,31,29,27,23,22,19,18,13,11,9,7,4,3,1
     b = 39,37,34,32,30,28,24,20,16,14,12,10,8,5,2
     c = 25,21,17
if   R = .5      (a,b,c) = (25,25,37)
     a = 40,38,36,33,31,29,25,22,18,14,12,10,8,5,3,1
     b = 39,37,34,32,30,27,23,21,19,17,13,11,9,7,4,2
     c = 28,24,20,16
if   R = .6      (a,b,b) = (27,24,36)
     a = 39,37,34,32,28,24,23,19,12,11,9,7,4,2
     b = 40,38,36,33,31,30,27,22,20,18,16,14,10,8,5,3,1
     c = 29,25,21,17,13
if   R = .7      (a,b,c) = (29,23,35)
     a = 39,37,34,30,27,22,18,14,11,8,4,2
     b = 40,38,36,33,31,29,25,23,21,19,17,13,10,9,7,5,3,1
     c = 32,28,24,20,16,12
if   R = .8      (a,b,c) = (30,23,34)
     a = 39,37,32,21,28,23,19,16,11,7,3,
     b = 40,38,36,34,30,27,24,22,20,18,14,12,10,8,5,4,2,1
     c = 33,29,25,21,17,13,9
```

Because R changes slowly as the vessel moves, R is not recomputed for each shot. Rather, an optimum value of R occurring over the subsurface length of the cable is used to control the number of sources in each group for the three-point operator shots.

Conventional analog or hard wired digital circuits may be used in implementing the invention. However, the preferred embodiment of the invention makes use of a small general purpose digital computer which is carried on board the vessel. One example of such a computer which has been successfully used is the Texas Instruments 980A computer.

While a particular embodiment has been shown and described, other modifications are within the true spirit and scope of the invention. The appended claims are, therefore, intended to cover such modifications.

What is claimed is:

1. In marine seismic exploration which includes:
   firing at least one source in an array of sources towed by a marine vessel,
   recording seismograms representing the reflected seismic pulses,
   measuring the water bottom reflectivity and the water depth from the recorded seismograms,
   converting the measurements of reflectivity and water depth into a time domain operator representative of the inverse of the reverberaion distortion in the water layer between the water bottom and water surface, and
   thereafter firing said array of sources in groups such that the acoustic pulses from each of said sources combine to produce a resultant acoustic pressure wave having said time domain operator characteristic in its travel to and from the subsurface formation,
   the improvement wherein said measuring comprises the steps of:
   generating the zero lag auto-correlation coefficients of a window of said seismogram,
   generating the auto-correlation coefficients of said window with a lag of n time samples,
   generating the auto-correlation coefficients of said window with a lag of 2n time samples,
   repeating the foregoing for various values of n, combining the auto-correlation coefficients generated for each value of n, and selecting the n producing the minimum in the combined auto-correlation functions as being representative of water depth.

2. The invention recited in claim 1 further comprising:

generating the values $S_0$, $S_1$ and $S_2$ of the auto-correlation function of said window at the sample times of o, n and 2n respectively.

3. The invention recited in claim 2 wherein said combining step comprises summing said values of the auto-correlation function in accordance with the following:

$$2.0625 \, S_0 + 2.5 \, S_1 + 0.5 \, S_2.$$

4. The invention recited in claim 2 further comprising:

converting the number of time samples n into $T_w$, two-way travel time of acoustic energy through said water depth.

5. The invention recited in claim 4 wherein measuring said water bottom reflection coefficients comprises the steps of:

generating an estimate of reflectivity from $$\hat{R} = \frac{2S_2}{3S_1}$$

determining the length of said window in terms of the number n of two-way travel times $T_w$ in said window by $$N = \frac{\text{time length of window (msecs.)}}{T_w \text{ (msecs.)}}$$

determining the value of the coefficients $A_0$, $A_1$, $A_2$ from $$A_0 = .0048 \left(\frac{1}{n}\right) - .0174 \left(\frac{1}{n}\right)^2$$
$$A_1 = -.0006 + .0786 (n) - .0022 (n)^2$$
$$A_2 = .0023 + 17.055 \left(\frac{1}{n}\right) - 25.691 \left(\frac{1}{n}\right)^2, \text{ and}$$

determining the reflectivity $R$ from
$$R = A_0 + A_1 \hat{R} + A_2 \hat{R}^2.$$

6. The invention recited in claim 1 wherein the steps of firing at least one of said sources and thereafter firing said sources in groups are carried out alternately, and wherein the step of measuring water depth is carried out from seismograms recorded from the firing of at least one of said sources, said measured water depth being used in the next succeeding firing of said sources in groups, and wherein the step of measuring the water bottom reflectivity is carried out on seismograms produced from a plurality of preceding firings of at least one of said sources.

7. The method recited in claim 1 further comprising:
measuring water depth with a fathometer and selecting said window of said seismogram with a length equal to twice the fathometer reading divided by the velocity of seismic energy in water.

* * * * *

UNITED STATES PATENT AND TRADEMARK OFFICE
CERTIFICATE OF CORRECTION

PATENT NO. : 4,234,938
DATED : November 18, 1980
INVENTOR(S) : Kenneth P. Allen and Maynard S. Redeker It is certified that error appears in the above-identified patent and that said Letters Patent are hereby corrected as shown below:

Please make the following corrections to the above identified patent.

In the Abstract, line 8, "autocorrelation" should read -- auto-correlation --.

Column 3, line 20, "unit" should read -- unity --.

Column 6, equation 7, After the second "S" the sub "I" should be sub -- i --.

Column 7, equation 10, After the fourth "S" the sub "1" should be sub -- i --.

Column 7, equation 11, After the second "S" the sub "1" should be sub -- i --.

Column 8, line 21, In the line "a = ..." the fourth number should be changed from "21" to -- 31 --.

Signed and Sealed this

Seventh Day of April 1981

[SEAL]

Attest:

RENE D. TEGTMEYER

*Attesting Officer*  *Acting Commissioner of Patents and Trademarks*